United States Patent
Boettcher

(10) Patent No.: US 6,990,236 B2
(45) Date of Patent: Jan. 24, 2006

(54) FAST METHOD OF FINDING APPROXIMATE NEAREST NEIGHBOR IN HIGH-DIMENSIONAL SPACE WITH A DYNAMICALLY CHANGING SAMPLE

(75) Inventor: Mark Edward Boettcher, Christchurch (NZ)

(73) Assignee: Sharp Laboratories of America, Inc., Camas, WA (US)

( * ) Notice: Subject to any disclaimer, the term of this patent is extended or adjusted under 35 U.S.C. 154(b) by 710 days.

(21) Appl. No.: 09/999,551

(22) Filed: Nov. 30, 2001

(65) Prior Publication Data

US 2003/0123731 A1 Jul. 3, 2003

(51) Int. Cl.
G06K 9/00 (2006.01)
G06K 9/32 (2006.01)
(52) U.S. Cl. ................................ 382/181; 382/298
(58) Field of Classification Search ................ 382/103, 382/181, 201, 205–206, 218, 298, 300; 348/169
See application file for complete search history.

(56) References Cited

U.S. PATENT DOCUMENTS

| | | | | |
|---|---|---|---|---|
| 4,004,852 | A | * | 1/1977 | Pentecost .................... 356/3.15 |
| 5,305,395 | A | * | 4/1994 | Mahoney et al. ........... 382/205 |
| 5,408,541 | A | * | 4/1995 | Sewell ........................ 382/291 |
| 5,617,486 | A | * | 4/1997 | Chow et al. ................ 382/181 |
| 5,953,463 | A | | 9/1999 | Tanaka et al. .............. 382/298 |
| 6,026,180 | A | * | 2/2000 | Wittenstein et al. ........ 382/166 |
| 6,289,354 | B1 | * | 9/2001 | Aggarwal et al. ....... 707/104.1 |

OTHER PUBLICATIONS

Arya, et al. discloses "An optimal algorithm for approximate nearest neighbor searching in fixed dimensions", ACM, pp. 891-892 1998.*

* cited by examiner

Primary Examiner—Daniel Mariam
(74) Attorney, Agent, or Firm—Robert D. Varitz, PC

(57) ABSTRACT

A method of approximating a nearest neighbor includes identifying a target value in an image; selecting a range about the target value; analyzing each neighboring value to determine if the neighboring value is within the range; and expanding the range until a neighboring value is determined to be the neighboring value closest to the target value.

8 Claims, 1 Drawing Sheet

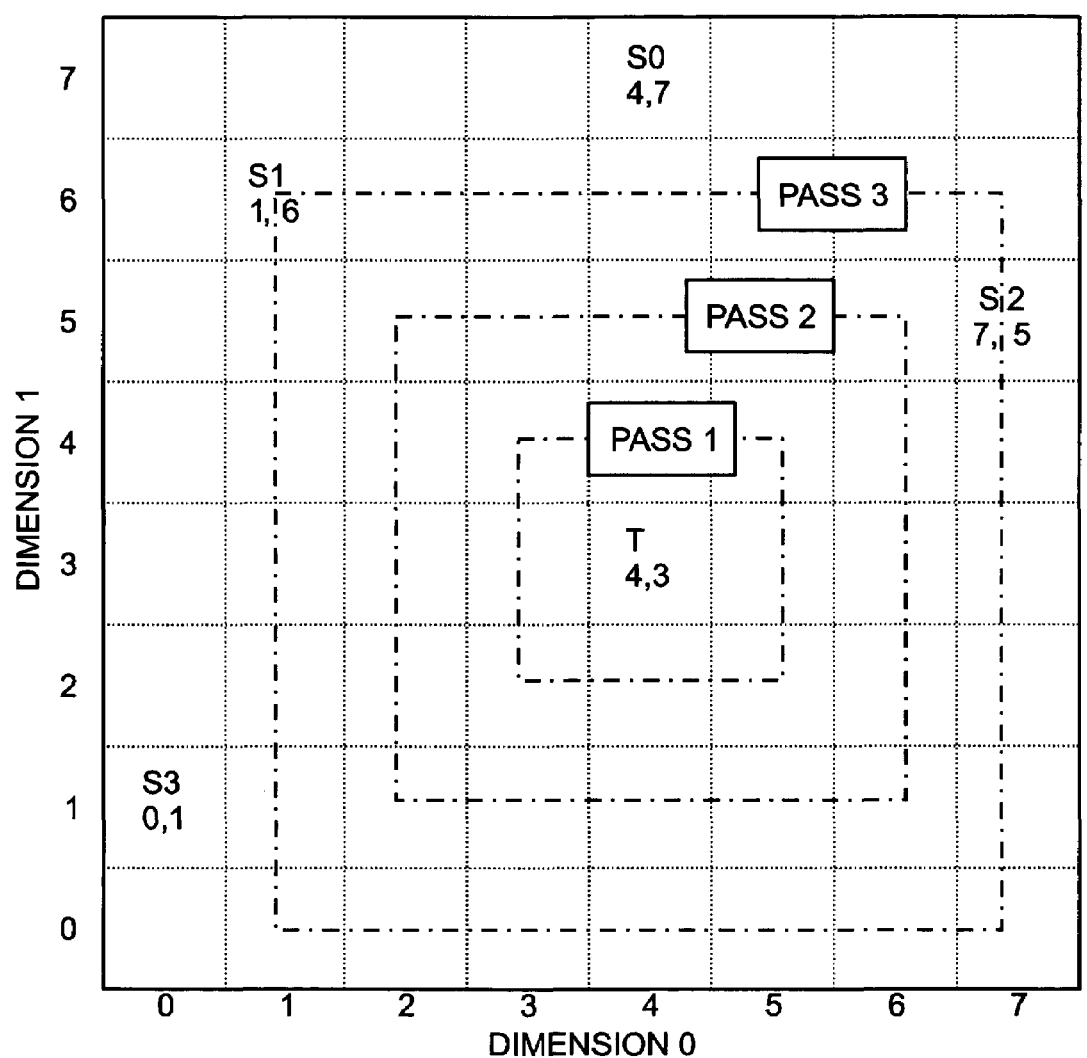

FAST METHOD OF FINDING APPROXIMATE NEAREST NEIGHBOR IN HIGH-DIMENSIONAL SPACE WITH A DYNAMICALLY CHANGING SAMPLE

FIELD OF THE INVENTION

This invention relates to digital image processing, and specifically to a method for determining, in an approximate manner, a point closest to a target value.

BACKGROUND OF THE INVENTION

Sometimes it is desirable to find the closest point in a sample of points to an arbitrary point in high dimensional space. In many cases, an approximate value is sufficient, particularly n the field of image processing where speed is a consideration.

One example of such a case is scaling a palletized bitmap image using bilinear or trilinear scaling. In this example, desired color RGB values are computed and an efficient means must be found to obtain the nearest color in the limited existing palette of RGB values. In this case, one is looking for the closest point in three dimensions.

Another example is the idea of image compression, or upscaling, where there is a large library of 8×8 pixel block layouts. For compression, the image is divided into 8×8 pixel blocks, and a search is conducted for the nearest match in a 64-dimensional space from the library sample. Once found, the entire 8×8 block can be represented by an offset value into the library rather than 64 individual RGB values, giving a 64-1 lossy compression.

The most common method of obtaining the closest point is to use the formula for determining Euclidean distance and extrapolating it out to the number of dimensions required.

This calculation takes the form of:

$$L^2 = \sum_{i=1}^{N} x_i^2$$

where N is the number of dimensions and L is the distance.

This calculation must be done for each sample, determining the distance for each sample and then comparing the distance until the closest point is located. This method is accurate, but slow, particularly in multi-dimensional systems with large sample sizes. The method requires a large number of multiplications, which, on present-day computers, are generally slower than additions.

There are other methods, such as the use of Octrees or binary space partitioning, which generally provide fast searches, but which require a significant amount of preprocessing. This technique is not suitable for cases in which the sample is dynamically changing, or in cases where only a limited number of searches are needed.

A somewhat similar algorithm which is used extensively for nearest neighbor determination, generally in 3-dimensional space, is Octree Quantization which utilizes preprocessing of the sample to gain speed. The intention of Octree is very similar, although the technique is essentially different. A reference to this is in "Graphics Gems," Volume I, Chapter IV, *Color Quantization by Octree Quantization*, by Gervautz and Purgathofer U.S. Pat. No. 5,953,463, granted Sep. 14, 1999, to Tanaka et al., for Image processing method and image processing apparatus describes image processing wherein an image is divided into blocks, the various components of the blocks are detected, and wherein density of a target picture element is derived as a function of adjacent picture elements.

SUMMARY OF THE INVENTION

A method of approximating a nearest neighbor includes identifying a target value in an image; selecting a range about the target value; analyzing each neighboring value to determine if the neighboring value is within the range; and expanding the range until a neighboring value is determined to be the neighboring value closest to the target value.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIG. 1 is a graph of a two-dimensional hypercube of the method of the invention.

DETAILED DESCRIPTION OF THE PREFERRED EMBODIMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

This solution is different from the prior art in that it neither requires preprocessing nor time-consuming computations. As a result it is extremely fast in the cases where preprocessing capabilities are not available.

For ease of explanation, the following discussion and examples are presented in the case of two-dimensions. The method of the invention, however, scales to any number of dimensions. Consider the example of Table 1:

TABLE 1

|  | Dimension 0 Value | Dimension 1 Value |
| --- | --- | --- |
| Target Value (T) | 4 | 3 |
| Sample 0 (S0) | 4 | 7 |
| Sample 1 (S1) | 1 | 6 |
| Sample 2 (S2) | 7 | 5 |
| Sample 3 (S3) | 0 | 1 |

In this example, "Target Value" is the point to which we wish to find the closest point from the four samples, S0 to S3. It is assumed that the maximum value in any dimension is 7. A graph of this example is presented as FIG. 1. If the Euclidean distance formula is used, the following distances for each sample point from the target point are found:
Sample 0 —4.00
Sample 1 —4.24
Sample 2 —3.61
Sample 3 —4.47

Each of these distance calculations requires, for each dimension, two subtractions and two multiplications, one addition, and a square root. Because these distances are relative, the square root operation may be omitted, however, a number of multiplications are still required. In a case where there are scores of dimensions, and a sample size in the hundreds or thousands, millions of relatively time-consuming multiplications may be required.

The method of the invention makes the assumption that a 'close-enough' nearest point method suffices for many applications. A range, which is a region surrounding the target, is selected, which may be thought of as a hypercube surrounding the target point with arbitrary boundaries. Each point, or neighboring value, is analyzed, iteratively, for each dimension to determine if that point is contained in the hypercube. This makes the calculations as simple as possible.

Referring to FIG. 1, in pass 1, the presence of points with values of 3 –5, inclusive, in Dimension 0 ($D_0$) and values of 2 –4, inclusive, in Dimension 1 ($D_1$), are investigated. It can be seen that point S0 is in the value set of dimension 0, but not in the value set of dimension 1.

In pass 2, $D_0$ 2 –6 and $D_1$ 1 –5, points S0, S2 and S3 are each located in one dimension only, so none are candidates yet. In pass 3, $D_0$ 1 –7 and $D_1$ 0 –6, both points S1 and S2 'nearest point,' or the Euclidean distance calculation may be used to determine the closest of the two points.

The following pseudo-code illustrates this portion of the preferred embodiment of the method of the invention:

a region 512 in size around the target point at that dimension's value. GreatestRange is initialized to the maximum value: 1024 in this case.

If only one point is in the range for every dimension, then that point is the closest point. If no points are in the range for every dimension, then the range size is incremented by (GreatestRange–range)/2. If more than one point is in the range, then GreatestRange is set to range and range is decreased by ½. This process is repeated until the difference in range and GreatestRange is less than or equal to 2. The last point that was actually in range at any point is the nearest point.

The method of the invention may also be used to find the actual nearest neighbor in a much reduced time as follows: using the method of the invention, a candidate, or candidates, is located. The actual distance between the closest of the candidate(s) and the target is determined, and the range expanded until a side of the hypercube is the actual distance. For every point found, the actual distance from the point to the target is calculated to determine whether it is the closest point. While this procedure is as time consuming as the brute force method, it will, in almost all cases, be examining a greatly reduced sample, so there will still be a net gain.

The method of the invention has applicability for purposes other than image processing, such as finding the shortest path between points, i.e., path reduction.

```
//
//    initialize
//
range equals some value larger than 2
bestCandidate = sample 0
//
//    start of code
//
:beginhere
if range equals 2 then return bestCandidate
for each point in the sample
    point.hits = 0
    for each dimension in that point
        if point.values[ dimension ] is >= target.values[ dimension ] – range/2 and
            point.values[ dimension ] is <= target.values[ dimension ] + range/2
                then increment point.hits
        else
            next point
nCandidates = 0
for each point in the sample
    if point.hits is equal to nDimensions
        increment nCandidates
        bestCandidate = point
if nCandidates equals 1 then return bestCandidate // we're done
if nCandidates > 1
then decrease range
goto beginHere
if nCandidates equals 0
then increase range
goto beginHere
```

In my prior patent application, I disclose a method similar to the method of the invention which begins with a range of two, and increments the range every iteration until at least one sample is found to be totally contained in the subject hypercube.

The key to this method of the invention is to use a binary rangefinder, i.e., the range initializes to a value of one-half the maximum value. If the maximum possible value in any dimension were 1024, for instance, the range is 512. This means that initially for each point and each dimension, the value in the dimension is checked to determine if it is within Thus, a fast method of finding approximate nearest neighbor in high-dimensional space with a dynamically changing sample has been disclosed. It will be appreciated that further variations and modifications thereof may be made within the scope of the invention as defined in the appended claims.

I claim:

1. A method of approximating a nearest neighbor, comprising:

identifying a target value in an image;

selecting a range about the target value, including using a binary rangefinder, including selecting a GreatestRange value for the range;

analyzing each neighboring value to determine if the neighboring value is within the range; and expanding the range until a neighboring value is determined to be the neighboring value closest to the target value, including locating a neighboring value(s); determining an actual distance between the closest of the neighboring value(s) and the target value; and expanding the range until a side of a range hypercube is the actual distance between the nearest neighboring value and the target value.

2. The method of claim 1 which further includes calculating a Euclidean distance from the target value to a neighboring value to confirm that the neighboring value is the nearest neighbor to the target value.

3. The method of claim 1 wherein said analyzing includes setting a range to one-half the value of GreatestRange.

4. A method of approximating a nearest neighbor, comprising:

identifying a target value in an image;

selecting a range about the target value, including using a binary rangefinder and selecting a GreatestRange value for the range;

analyzing each neighboring value to determine if the neighboring value is within the range, including setting a range to one-half the value of GreatestRange; and expanding the range until a neighboring value is determined to be the neighboring value closest to the target value.

5. The method of claim 4 which further includes calculating a Euclidean distance from the target value to a neighboring value to confirm that the neighboring value is the nearest neighbor to the target value.

6. The method of claim 4 which further includes locating a neighboring value(s); determining an actual distance between the closest of the neighboring value(s) and the target value; and expanding the range until a side of a range hypercube is the actual distance between the nearest neighboring value and the target value.

7. A method of approximating a nearest neighbor, comprising:

identifying a target value in an image; selecting a range about the target value, including using a binary rangefinder and selecting a GreatestRange value for the range;

analyzing each neighboring value to determine if the neighboring value is within the range, including setting a range to one-half the value of GreatestRange;

expanding the range until a neighboring value is determined to be the neighboring value closest to the target value; and calculating a Euclidean distance from the target value to a neighboring value to confirm that the neighboring value is the nearest neighbor to the target value.

8. The method of claim 7 which further includes locating a neighboring value(s); determining an actual distance between the closest of the neighboring value(s) and the target value; and expanding the range until a side of a range hypercube is the actual distance between the nearest neighboring value and the target value.

* * * * *